E. D. DOUGHERTY.
PNEUMATIC TIRE VALVE.
APPLICATION FILED APR. 14, 1921.

1,420,245.

Patented June 20, 1922.

Inventor
E. D. Dougherty

By Jack Ashley
Attorney

UNITED STATES PATENT OFFICE.

EDWARD D. DOUGHERTY, OF DALLAS, TEXAS.

PNEUMATIC-TIRE VALVE.

1,420,245.  Specification of Letters Patent. Patented June 20, 1922.

Application filed April 14, 1921. Serial No. 461,221.

*To all whom it may concern:*

Be it known that I, EDWARD D. DOUGHERTY, a citizen of the United States, residing at Dallas, in the county of Dallas, and State of Texas, have invented certain new and useful Improvements in Pneumatic-Tire Valves, of which the following is a specification.

This invention relates to new and useful improvements in pneumatic tire valves.

The object of the invention is to provide a pressure release valve in the nature of an attachment which may be mounted on the usual tire valve and arranged to release the air pressure when the latter reaches the danger point, thereby relieving an excessive pressure in the tire and preventing rupture of the tire as frequently occurs under such conditions. A further object is to provide a device which may be readily attached to an ordinary tire valve in such a manner as not to interfere with the usual operation of the latter and which need not be removed or detached when the tire is inflated or deflated.

A construction designed to carry out the invention will be hereinafter described together with other features of the invention.

Figure 1:
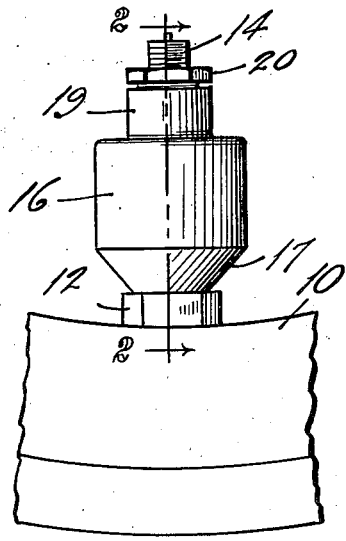
Figure 2:
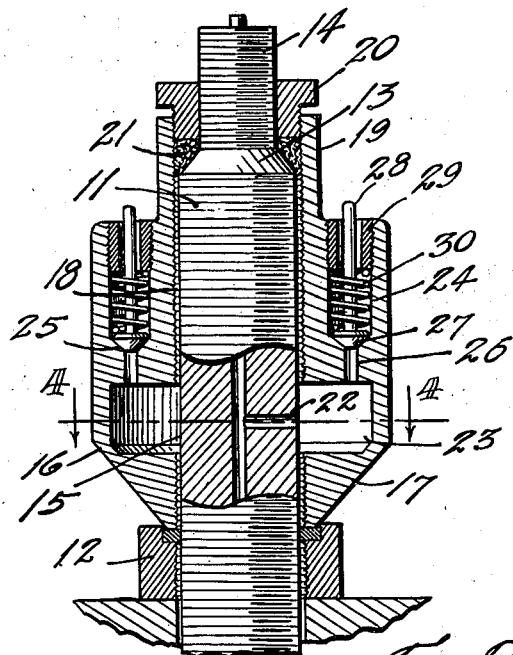
Figure 3:
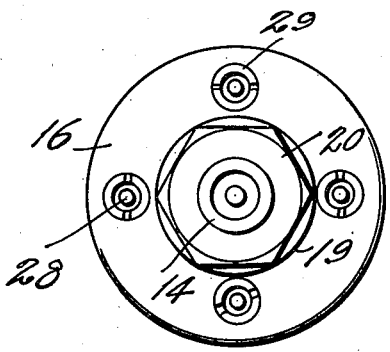
Figure 4:
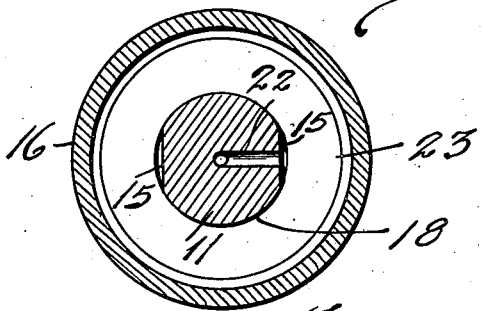

The invention will be more readily understood from a reading of the following specification and by reference to the accompanying drawings, in which an example of the invention is shown and wherein:

Fig. 1 is a side elevation of a device constructed in accordance with my invention and mounted on the valve of an ordinary pneumatic tire, Fig. 2 is a vertical sectional view of the same, Fig. 3 is a plan view, and Fig. 4 is a transverse sectional view on the line 4—4 of Fig. 2.

In the drawings the numeral 10 designates the felly of a motor vehicle wheel, 11 the usual valve stem which penetrates the felly and 12 the lock nut which is screwed down on the valve stem to contact with the felly. The valve stem has an inclined annular shoulder 13 near its upper end and a reduced screw threaded nipple 14. The body of the stem is screw threaded and is provided with opposite vertical panels 15 which are not screw threaded and are employed as wrench faces. The parts described are now in common use and form no particular part of the invention.

In carrying out the invention a cylindrical jacket 16 is provided and formed with a tapered end 17 at its bottom and an internally threaded central bore 18 adapted to screw onto the stem 11. The bottom of the jacket is reduced so as to engage on the upper surface of the nut 12. The upper end of the jacket is shouldered and provided with a contracted central collar 19 extending above the shoulder 13. A packing nut 20 is threaded on the nipple 14 and confines packing material 21 about the shoulder 13 whereby air tight joints are formed at the top of the panels 15.

Before the jacket is placed on the stem 11, a radial passage 22 is drilled into the stem so as to communicate with the center of the latter, whereby the air under pressure in the tire may escape through said passage. The jacket is provided with an annular cavity or chamber 23 which communicates with the passage 22. By this arrangement it is merely necessary to screw the jacket onto the stem and not to register any particular part of the jacket with the passage 22 as the cavity extends entirely around the jacket and when the latter is brought into contact with the nut 12, communication is established between said cavity and the valve stem. The jacket is provided with a plurality of vertical valve chambers 24 each having a valve seat 25 at its lower end which communicates with the top of the cavity by a port 26. I have shown four of these valve chambers, but it is to be understood that the number is not to be limited.

In each valve chamber a release valve comprising a head 27 and a stem 28 is arranged. Each stem passes through a retaining sleeve 29 screwed into the upper end of the chamber. On each valve stem a coiled spring 30 is confined between the head 27 and the sleeve 29, whereby the head is forced downwardly into contact with the valve seat. So long as the valve heads 27 remain seated the air cannot escape from the ports 26.

In adjusting the device the springs 30 are given such a tension as to resist unseating of the head 27 until a certain predetermined pressure is exerted under said heads. By means of the screw threaded sleeves 29 corrections may be easily made and the release valves may be properly adjusted when the jacket is placed in position. It will be seen that so long as the pressure in the tire does not exceed a margin of safety, the valve will remain seated, but should this pressure become excessive said valves will be raised from their seats and the pressure will be relieved. After the pressure has been reduced the springs will seat the valves and prevent deflation of the tire. It is pointed out that the upper end of the nipple 14 is left free so that the tire may be pumped up or deflated without removing the device, which is a very important feature. The jacket being securely fastened on the valve stem 11, will not become loose and rattle and will not interfere with the normal operation of the tire.

Various changes may be made in the dimension and shape of the part without departing from the spirit of the invention.

What I claim, is:

1. In a tire pressure release valve device, a jacket having an annular cavity for communication with the air passage of a valve stem, said jacket being provided with a screw threaded central bore for receiving a tire valve stem, a valve chamber in the jacket having connection with the cavity of the jacket, a spring pressed release valve disposed in the chamber of the jacket and normally preventing the discharge of air from the cavity, and a packing gland at the upper end of the jacket mounted in the central bore thereof.

2. In a tire air pressure release device, a jacket having a screw threaded central bore extending vertically therethrough and an annular cavity surrounding a portion of said bore, a plurality of valve chambers disposed in the jacket and connected with the cavity, said chambers having valve seats, release valves mounted in the chambers and engaging the seats thereof, springs surrounding the stems of the valves, and means for retaining the springs in the chambers and varying the tension thereof.

3. In a tire air pressure release device, a jacket having a screw threaded central bore extending vertically therethrough and an annular cavity surrounding a portion of said bore, a plurality of valve chambers disposed in the jacket and connected with the cavity, said chambers having valve seats, release valves mounted in the chambers and engaging the seats thereof, springs surrounding the stems of the valves, means for retaining the springs in the chambers and varying the tension thereof, and a packing gland nut threaded into the upper end of the bore of the chamber of the jacket.

4. In a tire pressure release device, the combination with a valve stem having a radial passage communicating with its air passage and a reduced nipple at its upper end, of a jacket having a vertical screw threaded bore engaging on the valve stem and provided with an annular cavity communicating with said passage, a packing gland mounted in the upper end of the jacket and surrounding the nipple of the valve stem, valve chambers provided in the cavity having valve seats connected with said cavity, and spring fastened valves mounted in the chambers and engaging said seats adjusted to remain seated against a normal air pressure from the tire.

In testimony whereof I affix my signature.

EDWARD D. DOUGHERTY.